Patented Feb. 20, 1934

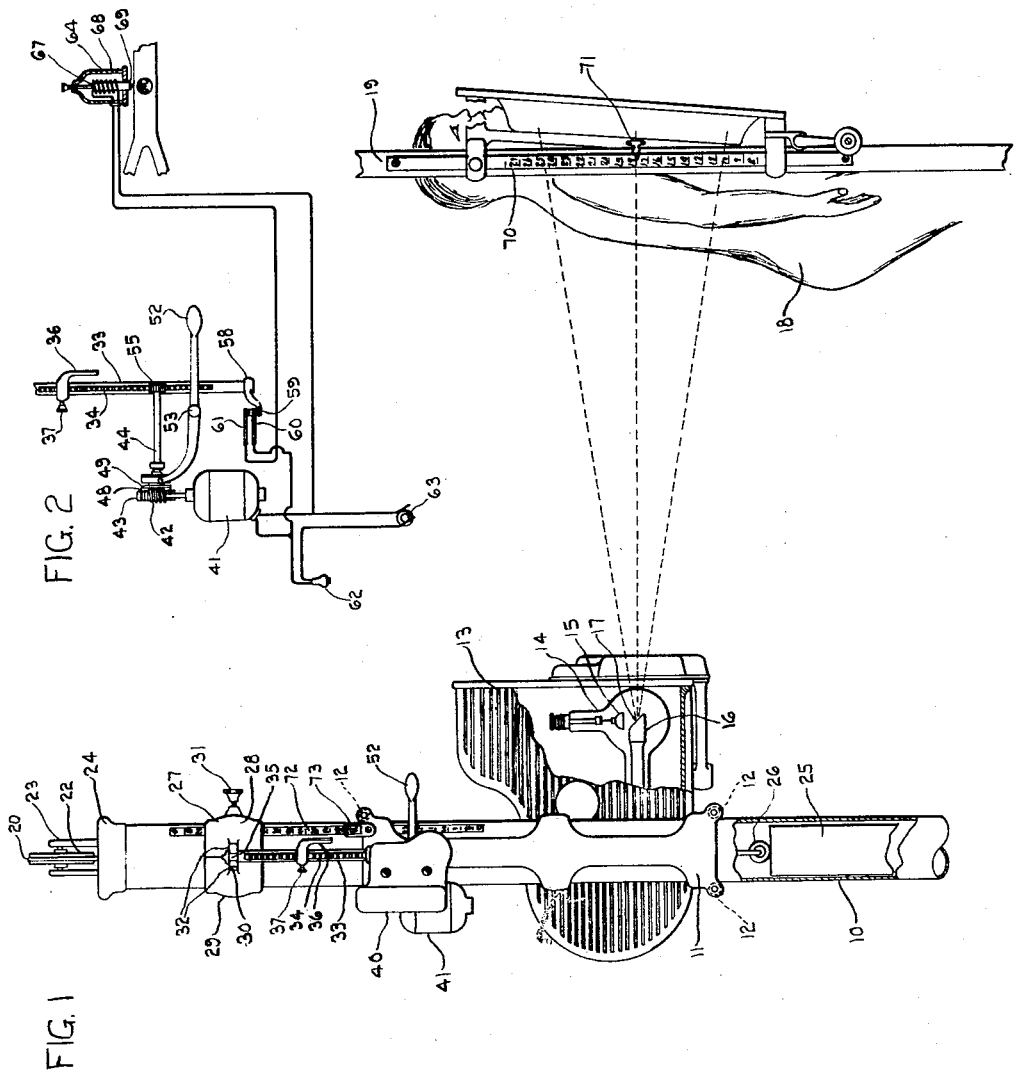
Feb. 20, 1934.  J. J. GROBE ET AL  1,947,846
X-RAY APPARATUS
Filed July 30, 1928   2 Sheets-Sheet 1
INVENTORS
JULIUS J. GROBE
ARTHUR J. KIZAUR
BY: *[signature]*
ATTORNEY

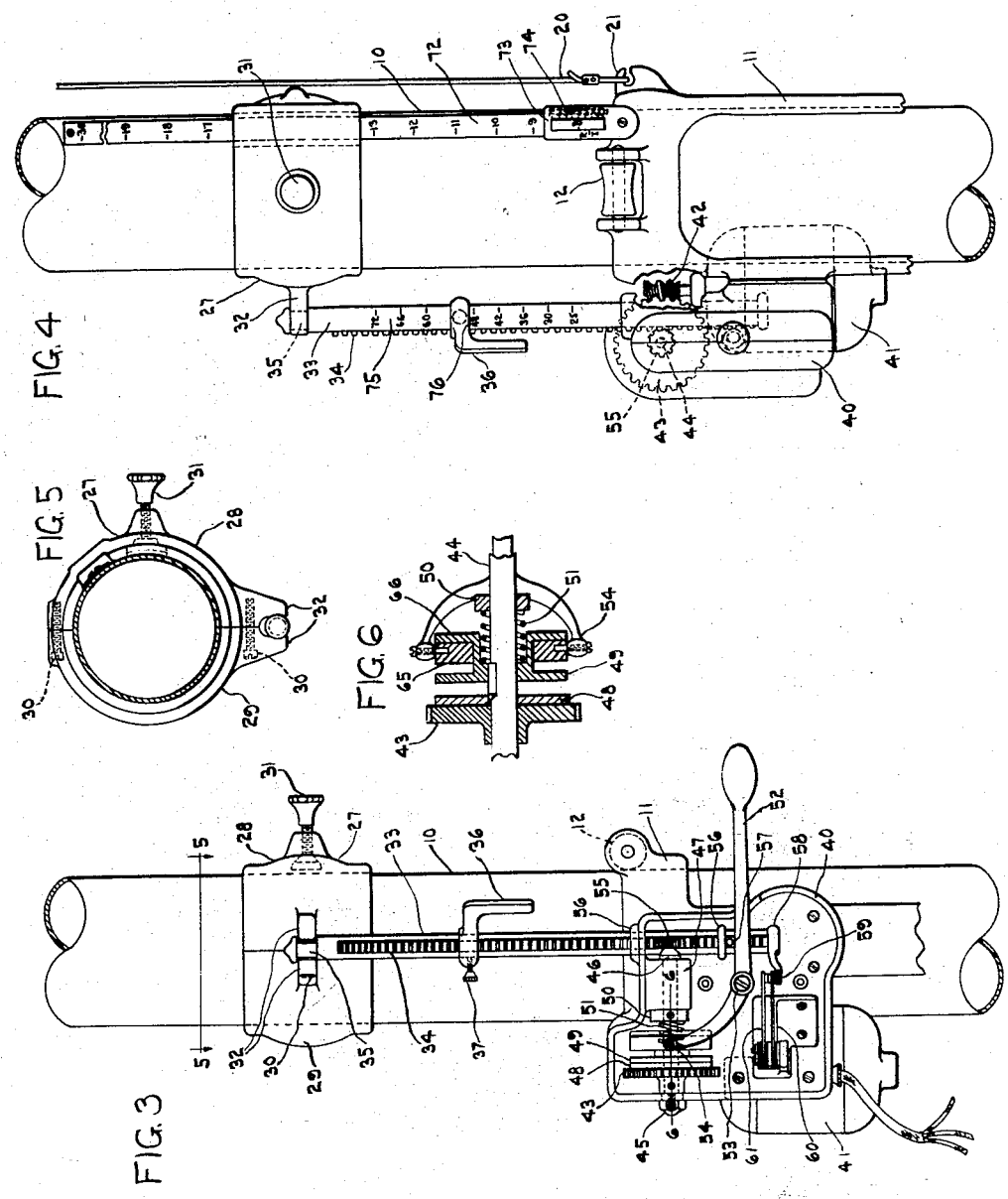

1,947,846

UNITED STATES PATENT OFFICE 1,947,846

X-RAY APPARATUS

Julius J. Grobe, Chicago, and Arthur J. Kizaur, Cicero, Ill., assignors to General Electric X-Ray Corporation, Chicago, Ill., a corporation of New York Application July 30, 1928. Serial No. 296,230

19 Claims. (Cl. 250—34)

The present invention has to do with a mechanism for the shifting of an X-ray tube whereby to produce stereoscopic sets of radiographs.

For the production of satisfactory stereoscopic sets of radiographs, it is necessary to make one radiograph in an initial position, and then to shift the X-ray tube a certain defined distance, after which a second radiograph is taken.

Under normal conditions the distance of shift is the same as the distance between the pupils of an human being's eyes, normally, about two and one-half inches.

Such radiographs, so taken, are placed in a viewing mechanism provided with suitable illuminating devices where the conditions existing at the time of their exposure are reproduced optically.

The ordinary variety of stereoscopic viewing device permits of the accurate reproduction of conditions only when the distance from the focal spot of the tube to the film is twenty-five inches or less. This distance will hereinafter be termed the "focal-film distance" by which name it is normally known in the X-ray art. Should the radiograph be taken at a distance greater than this, ordinary viewing devices can only be employed when the stereoscopic shift is increased proportionately beyond two and a half inches.

For "focal-film" distances greater than twenty-five inches the following shift distances are normally employed.

| Focal-film distance | Shift |
|---|---|
| Inches | Inches |
| 25 | 2.5 |
| 30 | 3.0 |
| 36 | 3.6 |
| 42 | 4.2 |
| 48 | 4.8 |
| 54 | 5.4 |
| 60 | 6.0 |
| 66 | 6.6 |
| 72 | 7.2 |

The device here illustrated is provided with an adjustment for permitting radiographs to be made at "focal-film" distances greater than twenty-five inches, as will be herein explained, in such manner that they may be viewed in conventional viewing devices.

The indexing means used in connection with the production of stereoscopic radiographs in the past has been needlessly involved and cumbersome, requiring the use of charts, and several independent scales and settings before the tube holder could be satisfactorily positioned and adjusted for the making of the desired views.

Stereoscopic shifts, in general, are conventional in the X-ray art. Heretofore, they have generally consisted of a compression or extension spring through the medium of which energy was stored up when the tube was in its initial position. A release of the tube, such release acting upon such spring device, and the latch for such release either being in the form of a mechanically or electrically actuated trigger mechanism, permitted the operator to release the energy stored in the spring and move the tube holder the desired or required distance.

As may be readily realized, the problem of controlling this energy so that the X-ray tube holder will be moved quickly and stopped without jarring is difficult. Both spring and dash pot mechanisms have been employed in the art for absorbing the surplus energy and for permitting the tube holding mechanism to be brought to a stop with a minimum of vibration. The necessity for making the stereoscopic negatives in a very short time interval, for instance, those made of the lungs requiring that both exposures must be made while the breath is being held, make it essential that this shifting of the mechanism take place in a very short space of time.

Such a circumstance complicates an already complex problem. In the past, a great variety of tube shifting mechanisms have been invented and placed on the market, but in spite of this activity in the inventive field, the average radiographer usually shifts by hand, for he finds from long experience that this is the wisest course, due to the marked physical variations in spring tension and in the various control devices which have been proposed, together with the variation in load due to the use of various accessories, such as ray confining cylinders on the tube holding device itself. The object of this invention, generally, is to provide a stereoscopic shifting mechanism in which all of the defects of the previously existing devices are satisfactorily overcome.

One of the objects of the invention is to provide a power source capable of delivering energy for moving the X-ray tube holder continuously and at a uniform speed, such as for example, an electric or spring motor.

A second object of the invention is to provide a control means for mechanically disengaging such power source from the shifting mechanism after the latter is moved the desired distance.

A third object is to provide indexing and setting means whereby the work of setting the tube holder and shifting mechanism is much simplified and the possibilities of error substantially reduced.

Other objects of the invention include the provision of novel and unique mechanisms for carrying out the principal objects recited.

These, and such other objects as may hereinafter appear, are attained by the novel construction, combination, and arrangement of the various elements consituting the device, the preferred embodiment of which is shown in the accompanying two sheets of drawings, in which:—

Figure 1 is an elevation, partly in section, disclosing an X-ray tube in position with respect to the patient and to a film holder with a scale of the tube holder rotated to bring it into view.

Figure 2 is a diagrammatic drawing of the connections involved in the operation of such a device.

Figure 3 is an enlarged elevation of a device as shown in Figure 1 with the cover of the device removed to shown its operating mechanism.

Figure 4 is a side elevation of the device shown in Figure 3.

Figure 5 is a section along the line 5—5 of Figure 3 viewed in the direction of the arrows.

Figure 6 is a section, fragmentary in nature, along the line 6—6 of Figure 3.

Like reference characters are used to designate similar parts in the drawings and in the description of the device which is hereinafter given.

Normally, the tube and tube shifting apparatus are conjointly disposed upon some form of vertical column, as for example a column 10 as is shown in Figure 1. This may comprise, in part, any tube holding standard, any standard used in association with a table, or any other device having a vertical support capable of maintaining a tube holder in position.

A sleeve 11 upon which the holding mechanism is mounted and which is adjustable up and down the vertical column 10 is provided with anti-friction rollers 12 which operate between said sleeve 11 and the vertical column 10.

A tube holding mechanism 13 is attached to sleeve 11 and is movable with the latter up and down upon column 10. In the present instance, the tube holding device is of the oil-immersed type, but it is to be understood distinctly that the application of the invention is not to be limited to this particular construction, or to any other particular construction, or to any particular type of tube, but is to embrace all tube stands in general.

Within the tube holding device 13 is an X-ray tube 14, such tube comprising a cathode 15, and an anode 16. The focal spot in said anode 16 is designated 17.

A patient 18 is shown in Figure 1. A film or film holder 19 is shown upon the far side of the patient 18.

A cable 20 having an eye 21 for attaching the cable 20 to sleeve 11 is adapted to operate over a pulley 22 at the top of tube column 10, such pulley 22 turning on a bearing 23, said bearings being held in extension upon the plate 24 at the top of column 10. Within the column 10 and shown by the sectioning of such column in Figure 1 is a counterweight 25 which is employed for the purpose of balancing the tube holder 13.

Said cable 20 is secured to said counterweight 25 by a means indicated 26.

Upon the column 10 is a stop collar 27 formed of two halves, the tapped half of such collar being marked 28, and the clearance half thereof being marked 29. Screws 30 for holding together said halves 28 and 29 of said collar 27 are disclosed.

In one of said halves, and in this particular instance in the half 28, a lock handle 31 is provided for securing the collar 27 in position upon column 10. It is manifest that any adjusted position may be obtained for said collar 27 and that such collar is maintained in such position by the use of lock screw 31.

At one side of the collar 27 is a laterally extending ear 32, in which one end of a vertical rod 33 is loosely held. The rod 33 comprises a rack portion 34, there being a reduced portion 35 upon said rod 33 co-operating with the ear 32 whereby the movements of said rod relatively to said collar 27 are determined by the snugness of the fit of said reduced portion within the ear 32.

An adjustable release stop 36 is provided upon the vertical rod 33, and a lock screw 37 for determining the position of said release stop 36 is employed. The stereoscopic shift device comprises a main casting 40 upon which an electric motor 41 is secured.

Operated by said motor is a worm 42, which actuates a gear wheel 43 secured to and rotating on a shaft 44, there being a nut 45 for securing one end of said shaft, and a stop collar 46 at the other end thereof. A bearing 47 for said shaft 44 is provided in the casting 40. A friction surface 48 is associated with the gear wheel 43, and adjacent to said friction surface 48 is a friction device 49 cooperating with said friction surface, and which is fixed against rotation on shaft 44, but which is movable longitudinally of said shaft. Another stop collar 50 is disposed intermediate the length of shaft 44, and in association therewith, is a spring 51 the purpose of which is to normally urge the friction members 48 and 49 together.

A hand lever 52 pivoted at 53 upon the housing 40, has a fork 54 at one end thereof pivotally engaging a horseshoe washer 65 which surrounds the reduced portion of the friction device 49 and engages the surface of a second friction disc 66. A gear wheel 55 is adapted to cooperate with rack 34, forming a part of rod 33 which is disposed on bearings 56 upon the housing 40, and in association with the rod 33 is a stop pin 57 whereby to prevent movement of said rod 33 beyond the position shown in Figure 3.

A contact closing member consisting of finger 58 is disposed at the lower end of rod 33, there being an insulated tip 59 on finger 58, and in association therewith is a movable contact 60 hereinafter referred to as the lower movable contact. Also in association with said rod 33 is an upper movable contact 61.

In association with the apparatus and controlled by a push button 62 is a source of power 63, which is adapted to actuate an electro-mechanical trigger, common in the art, and herein designated 64.

This device consists essentially of a solenoid 67 mounted in a casing 68 forming part of the magnetic circuit in which a movable core 69 is mounted, the end of the core serving as the plunger of the trigger device.

With the device as described are associated certain scales for the purpose of locating and setting the tube holder and shifting mechanism. Scale 70 is on the film changer 19 and is associated with an index point 71 for the purpose of indicating the height of the center of the film from any desired reference point, such for instance as the floor.

A similar scale 72 is provided on the tube column 10. The scale has a series of index points 74 mounted on an indicator 73. The distance of shift is determined through the medium of a scale 75 on the rod 33. An indicator 76 formed of one of the edges of the release stop 36 cooperates with the scale 75.

The operation of a device which has been described is generally as follows. The first position of the apparatus is disclosed in Figure 3 which position is also disclosed in Figure 1. In such position, one radiograph is made. Push button 62 is then depressed and the circuit completed from the source of power 63 simultaneously with the motor 41, and through the trigger mechanism 64 upon a plate shifter. The plate shifter, parts of which are here illustrated, is the subject matter of an application for Letters Patent in the name of Julius B. Wantz, Serial Number 20,855 entitled Cassette holder and filed April 4, 1925, now Patent No. 1,788,178, as of January 6, 1931. Such a result is had because of the fact that contact 60 and 61 are closed due to the interaction of a contact 60 with the contact closing member 58.

The motor 41 now begins to rotate causing gear wheel 43 to move through the actuation of worm 42.

As the friction surfaces 48 and 49 are in co-operation, such actuation also causes rotation of gear 55 upon rack 34, and movement of the entire tube holding mechanism upward toward collar 27, the lock handle 31 being tight so as to hold the collar in fixed relation with respect to the column 10.

Immediately upon this movement taking place, the contact 60 and 61 automatically move apart, thus opening the circuit to the trigger mechanism 64. This is of importance as it is necessary only to give a single impulse to this trigger, so that after the mechanism for shifting the film is released, the trigger will be in a position to hold the film shifting member in a second position. As long as the push button 62 is kept depressed, motor 41 continues to operate until finger 36 comes into engagement with lever 52 and shifts the latter downwardly, thus releasing the friction connection between the surfaces 48 and 49 and putting the friction washer 65 in engagement with the second friction disc 66 for the purpose of absorbing the inertia of the tube holder and bringing the latter to a stop quickly and without jar automatically.

The apparatus is capable of adjustment so that any desired distance within reasonable limitations may be obtained for movement of the tube shifting device. By referring to a chart, the proper shifts beyond two and one-half inches, are readily calculated. In order to obtain the best results scales and indicators are provided whereby references to charts and other auxiliaries are made unnecessary, and quick and accurate means for setting are provided.

In the past, the procedure for the making of a stereoscopic set of radiographs has been substantially as follows:

The patient was first positioned against a film shifting device and from a scale on such device, or from direct measurement, the distance to the center of the film from the floor or from other suitable reference point was obtained. The tube was next centered in a line with and at the desired focal film distance from the center of the film. This was done either by means of a scale on a tube column or by direct measurement from the floor.

A table of stereoscopic shifts was next consulted and the required shift for the desired focal film distance was selected. The tube holder was then moved above the center point by half the amount of the shift. During this operation, the stereoscopic shift mechanism was in the closed position. The locking collar on the stereoscopic shift mechanism was next locked on a tube column, the shift mechanism set for the desired amount of shift, and the tube holder mechanism moved downwardly a distance equal to the amount of shift desired, and set in its first position. In other words, the operation consisted of the following steps:—

(a) centering the film with respect to the patient.

(b) centering the tube with respect to the film.

(c) selecting the required shift distance from a table of instructions.

(d) moving the tube holder with the stereoscopic mechanism in the closed position upwardly by a distance equal to half the amount of the proposed stereoscopic shift.

(e) locking the stereoscopic lock collar in this position.

(f) setting the stereoscopic shift mechanism to shift the desired distance.

(g) setting the tube holder in its first position.

With the device described herein, however, this procedure is simplified as will be apparent from the following explanation.

After the film shifting device has been set in the desired position with respect to the patient, the distance from the floor to the center of the film is read directly on the scale provided for that purpose on the film shifting device.

The stereoscopic shift is now set for the desired shift. It is not necessary to go to a table to obtain this shift, as the amount of this shift is indicated directly on the stereoscopic shifting mechanism itself in terms of the focal film distance. With the entire stereoscopic shift tube holder free on the column, the tube holder is now centered relative to the film, using the scale on the tube column and using the index point corresponding to the focal film distance. The stereoscopic lock collar is now locked and the shift is in the initial position for the making of the first radiograph. The steps, therefore, are as follows:

(a) centering the film with respect to the patient.

(b) setting the stereoscopic shifting device in terms of the focal film distance.

(c) putting the tube holder in position for the making of the first radiograph and locking the stereoscopic lock collar.

The tube holding device here described is adapted to move at a constant speed, and is free from the sudden impulses of springs or like impelling mechanisms. Instead of the apparatus being catapulted into its second position, it is easily moved into such position, and the necessity for spring cushion dashpots, and other apparatus is thus terminated.

The operating handle 52 is, of course, employed for downward shifts of the tube. Downward pressure releases the friction surfaces in the clutch so that the shift may readily be made.

The tube moves upwardly only so long as the push button is depressed and its movement may be stopped at any time by the release of such button.

We claim:

1. A stereoscopic shift for an X-ray tube comprising a standard, an X-ray tube supporting member disposed upon said standard and adapted to reciprocate vertically thereupon, an X-ray tube on said member, a rack upon said standard and adjustable thereon, a motor upon said tube supporting member, a pinion adapted to be driven by said motor and engaging said rack, means for establishing electrical connection to said motor, and means for mechanically disconnecting said motor from said pinion when said X-ray tube is moved a predetermined distance.

2. A stereoscopic shift for an X-ray tube comprising a standard, a tube disposed upon said standard, said tube being mounted upon a tube supporting member adapted to reciprocate vertically upon said standard, a rack upon said standard and adjustable thereon, a motor upon said tube supporting member, a pinion associated therewith and adapted to engage said rack, means for establishing electrical connection to said motor, and means for mechanically disconnecting said motor from said pinion when said tube supporting member is moved a predetermined distance.

3. A stereoscopic shift for an X-ray tube comprising a standard, an X-ray tube supporting member disposed upon said standard, said member being mounted to reciprocate vertically upon said standard, an X-ray tube supported by said member, a rack upon said standard and adjustable thereon, a motor upon said tube supporting member, a pinion associated with said motor and adapted to engage said rack, means for establishing electrical connection to said motor, and means for mechanically disconnecting said motor from said pinion when said tube supporting member is moved a selectively predetermined distance.

4. A stereoscopic shift for an X-ray tube comprising a standard, an X-ray tube supporting member disposed upon said standard, and adapted to reciprocate vertically thereupon, a rack upon said standard and adjustable thereon, a motor upon said tube supporting member, a pinion associated with said motor and adapted to engage said rack, means for establishing electrical connection to said motor, manually operable means for mechanically disconnecting said motor and pinion, and means for mechanically disconnecting said motor from said pinion when said tube is moved a predetermined distance.

5. A stereoscopic shift for an X-ray tube comprising a standard, a tube disposed upon said standard, said tube being mounted upon a tube supporting member adapted to reciprocate vertically upon said standard, a rack upon said standard and adjustable thereon, a motor upon said tube supporting member, a pinion associated with said motor and adapted to engage said rack, means for establishing electrical connection to said motor, manually operable means for mechanically disconnecting said motor and pinion, and means for mechanically disconnecting said motor from said pinion when said tube supporting member is moved a predetermined distance.

6. A stereoscopic shift for an X-ray tube comprising a standard, an X-ray tube supporting member disposed upon said standard, said member being mounted to reciprocate vertically upon said standard, a rack upon said standard, an X-ray tube supported by said member and adjustable thereon, a motor upon said tube supporting member, a pinion associated with said motor and adapted to engage said rack, means for establishing electrical connection to said motor, manually operable means for mechanically disconnecting said motor and pinion, and means for disconnecting said motor from said pinion when said tube supporting member is moved a selectively predetermined distance.

7. Indexing means for the production of stereoscopic photographs comprising a scale adjacent a film shifting member for the purpose of determining position, a standard for supporting a tube, a scale on said standard equivalent to that on said film shifting member, a tube and a mounting therefor adjustable upon said standard, and means for shifting said tube upon said standard, said standard having a scale indicative of the shift required for various focal film distances.

8. Indexing means for the production of stereoscopic photographs comprising a scale in association with a film or plate shifting member for the purpose of determining position, a standard for supporting a tube, a scale on said standard equivalent to that on said plate shifting member, a tube and a mounting therefore adjustable upon said standard, means for shifting said tube upon said standard, said standard having a scale indicative of the shift required for various focal film distances, and an automatic stop adjustable upon said last mentioned scale and adapted to disengage said tube and shifting means.

9. Indexing means for the production of stereoscopic photographs comprising a scale in association with a film or plate shifting member for the purpose of determining position, a standard for supporting a tube, a scale on said standard equivalent to that on said film or plate shifting member, a tube and a mounting therefor adjustable upon said standard, a motor upon said mounting for shifting said tube, a pinion associated with said motor, a rack upon said standard and having a scale indicative of the shift required for various focal film distances, and an automatic stop upon said last mentioned scale adapted to mechanically disengage said motor and pinion upon said tube travelling a selected predetermined distance.

10. Indexing means for the production of stereoscopic photographs comprising a scale in association with a film or plate shifting member for the purpose of determining position, a standard for supporting a tube, a scale on such standard equivalent to that on said film or plate shifting member, a tube and a mounting therefor adjustable upon said standard, a motor upon said mounting for shifting said tube, a pinion associated with said motor, a rack upon said standard and having a scale indicative of the shift required for focal distances, and an adjustable member upon said last mentioned scale adapted to mechanically disengage said motor and pinion.

11. In a stereoscopic photographing apparatus, a standard, a rack on said standard, an X-ray tube supporting member disposed on said standard and adapted to reciprocate thereon, an X-ray tube on said tube supporting member, an electric motor on said supporting member, a pinion on said supporting member actuated by said motor and engaging said rack for shifting said X-ray tube supporting member from one point to another on said standard, switch means for energizing said motor, and means independent of said switch means for arresting the movement of said X-ray tube supporting member.

12. In a stereoscopic photographing apparatus, a standard, a rack on said standard, an X-ray tube supporting member on said standard and shiftable therealong, an X-ray tube on said supporting member, an electric motor on said tube supporting member, a pinion also on said tube supporting member actuated by said motor and engaging said rack for shifting said X-ray tube supporting member from one position to another on said standard, manually operable switch means for energizing said motor, and means for arresting the movement of said X-ray tube supporting means independently of said manually operable switch and independently of the actuation of said motor.

13. In a stereoscopic photographing apparatus, a standard, a rack on said standard, an X-ray tube supporting member disposed on said standard and movable therealong, an X-ray tube on said member, an electric motor on said X-ray tube supporting member, a pinion on said tube supporting member actuated by said motor and engaging said rack for shifting said tube supporting member from one position on said standard to another, manually controlled switch means for effecting the energization of said motor, and a second means independent of said manually controlled switch means and adjustable relatively to said standard for arresting the movement of said X-ray tube.

14. In a stereoscopic photographing apparatus, a standard, a rack on said standard, means for supporting an X-ray tube on said standard and movable therealong, an X-ray tube on said supporting means, a motor on said X-ray tube supporting member, a pinion on said tube supporting member in engagement with said rack and actuated by said motor for shifting said X-ray tube supporting means from one position to another along said standard, manually controlled switch means for energizing and deenergizing said motor, and means upon said rack and independent of said manually controlled switch means for stopping the movement of said X-ray tube.

15. In a stereoscopic photographing apparatus, a standard, a rack adjustable upon said standard, an X-ray tube supporting member on said standard and movable therealong, an X-ray tube on said supporting member, a motor on said supporting member, a pinion also on said tube supporting member and driven by said motor and engaging said rack for shifting said supporting member from one position to another along said standard, a manually controlled switch for said motor, and means adjustable relatively to said standard for arresting the shifting of said X-ray tube independent of the movement of said motor.

16. In a stereoscopic photographing apparatus, a standard, a rack adjustable on said standard, an X-ray tube supporting member on said standard and movable therealong, an X-ray tube on said support, an electric motor on said tube supporting member, a pinion on said tube supporting member and adapted to be driven by said motor, said pinion engaging said rack for shifting said X-ray tube supporting member from one position to another on said standard at a relatively constant speed, manually operable means for closing an electrical circuit to said motor, and means on said rack and adjustable therealong for arresting the shifting movement of said tube supporting member by said motor independently of and irrespective of the position of said circuit closing means.

17. In a stereoscopic photographing apparatus, a standard, a rack on said standard and adjustable therealong, an X-ray tube supporting member on said standard and movable therealong, an X-ray tube on said supporting member, means for shifting said X-ray tube supporting member from one position to another on said standard at a relatively constant speed, said shifting means including an electric motor, a pinion, clutch means intermediate said motor and said pinion, manually operable means for closing a circuit to said motor, and means for arresting the shifting of said X-ray tube supporting member independently of and irrespective of the rotary movement of said motor and comprising a member on said rack and adjustable relative thereto, said member being adapted to render said clutch inoperative when said tube supporting member has travelled along said standard a predetermined distance.

18. In a stereoscopic photographing apparatus, a standard, a rack on said standard, an X-ray tube supporting member on said standard, an X-ray tube on said supporting member, a plate holding device in operable relation to said standard, tube supporting member and tube having plates therein, means for shifting the plates in said holding device, an electric motor means, a pinion driven by said electric motor means and engaging said rack for shifting said X-ray tube supporting member predetermined distances along said standard at relatively constant speeds, a trigger upon said plate holding means for releasing said plate shifting means for movement therein, switch means for impressing electromotive force upon said motor and for conjointly actuating said trigger, and means for disengaging said motor from said pinion independent of said switch means to arrest movement of said X-ray tube supporting member.

19. In a stereoscopic photographing device, a standard, a rack upon said standard, an X-ray tube supporting member on said standard, an X-ray tube on said supporting member, electric motor means, a pinion adapted to be rotated by said motor and engaging said rack for shifting said X-ray tube supporting member predetermined distances along said standard, a film holding device in operable relation to said standard tube supporting member, and tube, means for shifting a film in said film holding device, a trigger mechanism for controlling said film shifting means, switch means for impressing electromotive force upon said motor and conjointly actuating said trigger, and means for disconnecting electromotive force from said trigger while continuing the impression of such force upon said motor.

JULIUS J. GROBE.
ARTHUR J. KIZAUR.